US012128675B2

(12) United States Patent
Hamada

(10) Patent No.: US 12,128,675 B2
(45) Date of Patent: Oct. 29, 2024

(54) IMAGE FORMING APPARATUS, CONTROL METHOD THEREOF, AND STORAGE MEDIUM

(71) Applicant: CANON KABUSHIKI KAISHA, Tokyo (JP)

(72) Inventor: Tetsuya Hamada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 170 days.

(21) Appl. No.: 17/863,117

(22) Filed: Jul. 12, 2022

(65) Prior Publication Data

US 2023/0017413 A1 Jan. 19, 2023

(30) Foreign Application Priority Data

Jul. 13, 2021 (JP) ................................ 2021-115830

(51) Int. Cl.
*B41J 13/00* (2006.01)
*B41J 11/00* (2006.01)
*B41J 29/393* (2006.01)

(52) U.S. Cl.
CPC ......... *B41J 13/0036* (2013.01); *B41J 11/002* (2013.01); *B41J 29/393* (2013.01)

(58) Field of Classification Search
CPC .... B41J 13/0036; B41J 11/002; B41J 29/393; B41J 15/16; B41J 15/04; B41J 11/42
See application file for complete search history.

(56) References Cited

U.S. PATENT DOCUMENTS 10,821,747 B1 * 11/2020 Mieney .................. B41J 11/002

FOREIGN PATENT DOCUMENTS

JP 2015-182245 A 10/2015

OTHER PUBLICATIONS

Kojima, Kenji, Printing Device and Printing Method; Oct. 22, 2015, Japan, All Pages (Year: 2015).*

* cited by examiner

*Primary Examiner* — Justin Seo
*Assistant Examiner* — Tracey M McMillion
(74) *Attorney, Agent, or Firm* — Venable LLP

(57) ABSTRACT

An image forming apparatus comprises a conveyance unit configured to convey a long-shaped print medium in a longitudinal direction, an image forming unit configured to form an image on the print medium, a drying unit configured to dry the print medium on which an image has been formed in the image forming unit, and a control unit configured to, after interrupting image formation on the print medium by the image forming unit, control the image forming unit and the conveyance unit so as to convey and then stop at an ejection position a portion of the print medium, on which image formation has been performed, from inside of the drying unit.

13 Claims, 11 Drawing Sheets

PRINTING

TEMPORARILY STOP PRINTING
·CONVEY UNTIL OUTSIDE DRYING APPARATUSES

STOP CONVEYANCE
·WAIT FOR PRINTING TO START

RESUME PRINTING

CUT AT INTERRUPTION MARKS

CUT AND REMOVE BLANK REGION AND CONNECT

IMAGE FORMING APPARATUS, CONTROL METHOD THEREOF, AND STORAGE MEDIUM

BACKGROUND OF THE INVENTION

Field of the Invention

The present invention relates to an image forming apparatus and a control method thereof.

Description of the Related Art

Among image forming apparatuses in which an image is printed by discharging and fixing ink onto a sheet-like print medium, image forming apparatuses in which ink is discharged by a print head onto a print medium fed from a roll into which the print medium has been wound and then the printed portion is wound into a rolled shape are known. When a printed print medium is wound into a rolled shape, if ink discharged onto the print medium has not sufficiently dried, the undried ink is retransferred to the print medium after being wound, and so the ink discharged onto the print medium is dried by a drying apparatus.

Incidentally, there are cases where a printing operation is stopped for some reason and a conveyance apparatus is also stopped accordingly. When a conveyance apparatus is stopped, a print medium stopped in the drying apparatus will be excessively heated, and therefore, a printing apparatus described in Japanese Patent Laid-Open No. 2015-182245 provides a function of moving out a printed region from the drying apparatus for when the operation of a conveyance unit is stopped for a predetermined time or more.

However, in the printing apparatus described in Japanese Patent Laid-Open No. 2015-182245, since a printed portion is stopped and remains inside the drying apparatus for a predetermined time, it is impossible to prevent the occurrence of a difference from a portion on which a normal drying operation has been performed. If a printed region is excessively heated, there occurs partial unevenness or deformation or change in a print substrate due to an increase in temperature, and therefore, there is a problem that the quality of printed matter deteriorates.

SUMMARY OF THE INVENTION

The present invention has been made in view of the above problem and provides an image forming apparatus capable of suppressing deterioration in the quality of printed matter caused by excessive drying of a print medium.

According to a first aspect of the present invention, there is provided an image forming apparatus comprising: a conveyance unit configured to convey a long-shaped print medium in a longitudinal direction; an image forming unit configured to form an image on the print medium; a drying unit configured to dry the print medium on which an image has been formed in the image forming unit; and a control unit configured to, after interrupting image formation on the print medium by the image forming unit, control the image forming unit and the conveyance unit so as to convey a portion of the print medium on which image formation has been performed up to an ejection position at which the portion is ejected from inside of the drying unit and then stop the conveyance.

According to a second aspect of the present invention, there is provided a method of controlling an image forming apparatus having a conveyance unit configured to convey a long-shaped print medium in a longitudinal direction, an image forming unit configured to form an image on the print medium, and a drying unit configured to dry the print medium on which an image has been formed in the image forming unit, the method comprising: after interruption of image formation on the print medium by the image forming unit, controlling the image forming unit and the conveyance unit so as to convey a portion of the print medium on which image formation has been performed up to an ejection position at which the portion is ejected from inside of the drying unit and then stop the conveyance.

According to a third aspect of the present invention, there is provided a non-transitory computer readable storage medium storing a program for causing a computer to execute a method of controlling an image forming apparatus having a conveyance unit configured to convey a long-shaped print medium in a longitudinal direction, an image forming unit configured to form an image on the print medium, and a drying unit configured to dry the print medium on which an image has been formed in the image forming unit, the method comprising: after interruption of image formation on the print medium by the image forming unit, controlling the image forming unit and the conveyance unit so as to convey and then stop at an ejection position at which the portion has been ejected from inside of the drying unit a portion of the print medium on which image formation has been performed.

Further features of the present invention will become apparent from the following description of exemplary embodiments with reference to the attached drawings.

DESCRIPTION OF THE EMBODIMENTS

Figure 1:
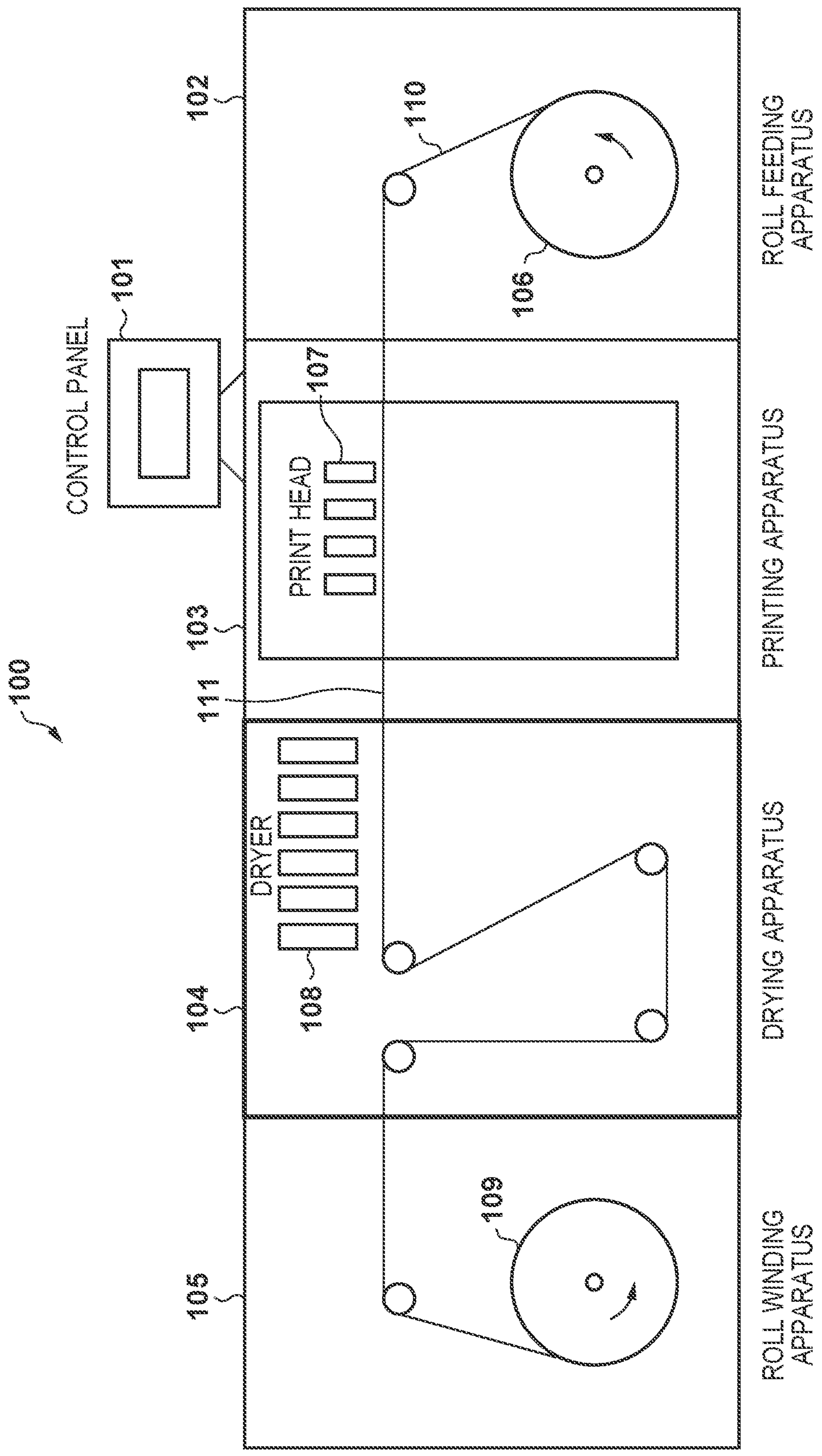
FIG. 1 is a diagram illustrating a schematic configuration of an image forming apparatus according to a first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

Hereinafter, a configuration of an image forming apparatus according to a first embodiment of the present invention will be described. FIG. 1 is a diagram illustrating a schematic configuration of an image forming apparatus 100 according to the first embodiment.

In FIG. 1, the image forming apparatus 100 is provided with a control panel 101, a roll feeding apparatus 102, a printing apparatus 103, a drying apparatus 104, and a roll winding apparatus 105. The control panel 101 can perform control of each unit of the roll feeding apparatus 102, the printing apparatus 103, the drying apparatus 104, and the roll winding apparatus 105.

In the roll feeding apparatus 102, a roll 106 into which an unprinted print substrate 110 has been wound is disposed, and the print substrate 110 is pulled out from the roll 106 and is printed. In the printing apparatus 103, a print head 107 is disposed, and printing is performed by discharging ink onto the print substrate 110. Printed matter 111 on which printing has been performed (the print substrate 110 on which printing has been performed) is dried by a dryer 108 in the drying apparatus 104. The dried printed matter 111 is wound by the roll winding apparatus 105 to form a roll 109 of printed matter.

Figure 2:
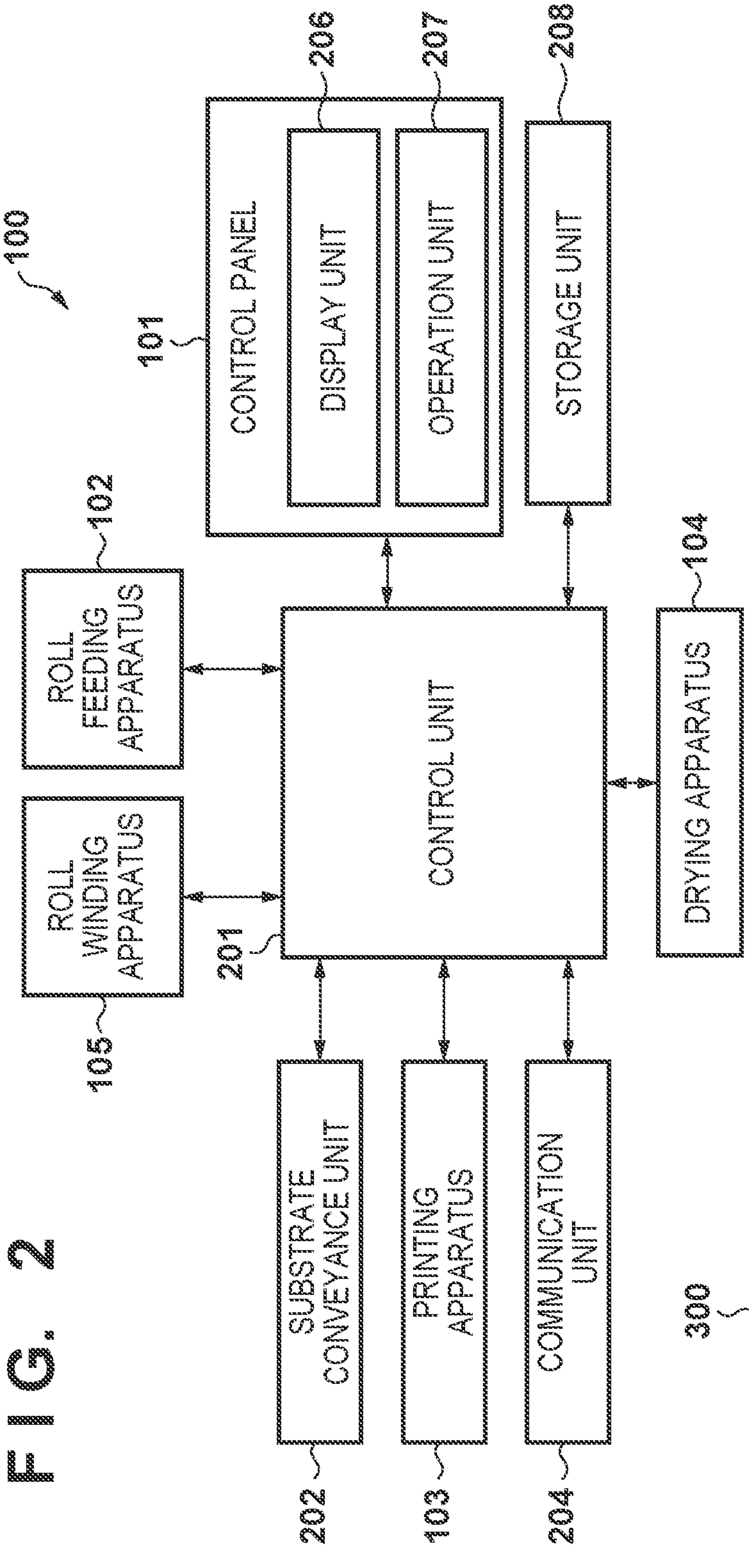
FIG. 2 is a diagram illustrating a block configuration of the image forming apparatus.

FIG. 2 is a diagram illustrating the relationship between a control unit and each unit of the image forming apparatus 100.

In FIG. 2, a control unit 201 disposed in the control panel 101 is configured by a CPU (Central Processing Unit), a RAM (Random Access Memory), and the like. A CPU of the control unit 201 reads out various programs such as a system program and a processing program stored in a storage unit 208 and deploys them in the RAM. The CPU can execute various kinds of processing in accordance with the deployed programs and can perform image forming processing in accordance with a user instruction. More specifically, the CPU controls the roll feeding apparatus 102, the printing apparatus 103, the drying apparatus 104, and the roll winding apparatus 105 for image forming processing. Furthermore, as another function, the control unit 201 is also provided with a function for controlling a substrate conveyance unit 202 for conveying the print substrate 110, a communication unit 204 for communicating various kinds of data, and a display unit 206 and an operation unit 207 of the control panel 101.

The substrate conveyance unit 202 is a conveyance mechanism that conveys the long-shaped print substrate 110 wound into a rolled shape and mounted on the image forming apparatus 100 in a longitudinal direction. It is a mechanism for conveying the print substrate 110 fed from the roll feeding apparatus 102 by a plurality of conveyance rollers to the printing apparatus 103 and conveying the printed matter 111 printed by the printing apparatus 103 to the roll winding apparatus 105 via the drying apparatus 104.

The printing apparatus 103 forms an image on the print substrate 110 fed from the roll feeding apparatus 102 based on print data for which a print instruction has been received.

The communication unit 204 is configured by a communication control card such as a LAN (Local Area Network) card. It transmits and receives various kinds of data to and from an external apparatus (e.g., a personal computer) connected to a communication network such as a LAN and a WAN (Wide Area Network).

The control panel 101 is provided with, for example, the display unit 206 and the operation unit 207 configured by a liquid crystal display (LCD) with a touch panel. The display unit 206 displays various kinds of information on a display screen in accordance with a display control signal inputted from the control unit 201. In addition to the above-described touch panel, the operation unit 207 is provided with various input devices such as a keyboard and a mouse and receives various input operations by a user and outputs operation signals to the control unit 201.

The storage unit 208 is configured by a volatile semiconductor memory (so-called flash memory), an HDD (Hard Disk Drive), and the like. The storage unit 208 stores various programs including a system program and a processing program to be executed by the control unit 201 and various kinds of data necessary for execution of these programs.

The roll feeding apparatus 102 supplies the print substrate 110 wound into a rolled shape for printing in the printing apparatus 103. The roll winding apparatus 105 winds the printed matter 111 printed by the printing apparatus 103 and dried by the drying apparatus 104 into a rolled shape. Winding into a rolled shape makes it easier to execute management and delivery. The roll feeding apparatus 102 is disposed upstream in a conveyance direction of the substrate conveyance unit 202 with respect to the printing apparatus 103, and the roll winding apparatus 105 is disposed downstream in the conveyance direction of the substrate conveyance unit 202 with respect to the drying apparatus 104.

The drying apparatus 104 is provided with a dryer that has a heating element, which becomes hot, and blows hot air. When the ink in a portion printed by the printing apparatus 103 is not sufficiently dry and is directly wound by the roll winding apparatus 105, the undried ink is retransferred to the print substrate 110. Therefore, it is necessary to perform sufficient drying. Drying is performed by controlling temperature and air volume in accordance with the characteristics of the print substrate 110. If a set temperature is too high, the print substrate 110 may become deformed, and if it is too low, the printing surface will not be sufficiently dry.

Figure 3:
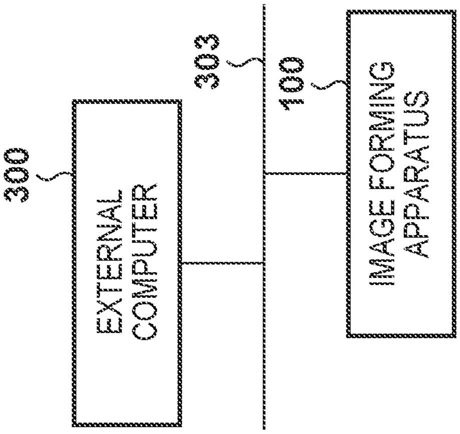
FIG. 3 is a diagram illustrating an example of a configuration of an image forming system.

Next, the operation for when printing is performed on the print substrate 110 in the image forming apparatus 100 according to the present embodiment will be described. FIG. 3 is a diagram illustrating an example of a system configuration of the present embodiment.

As illustrated in FIG. 3, an external computer 300 and the image forming apparatus 100 are connected via a communication network 303. It does not matter even if a plurality of external computers 300 and image forming apparatuses 100 are arranged. The user creates data to be printed on the external computer 300. The external computer 300 sets print data, print settings, and a print quantity setting together as a print job (an image forming job) and transmits it to the image forming apparatus 100 via the communication network 303. The control unit 201 of the image forming apparatus 100 receives the data of the print job transmitted from the external computer 300 via the communication unit 204.

Figure 4:
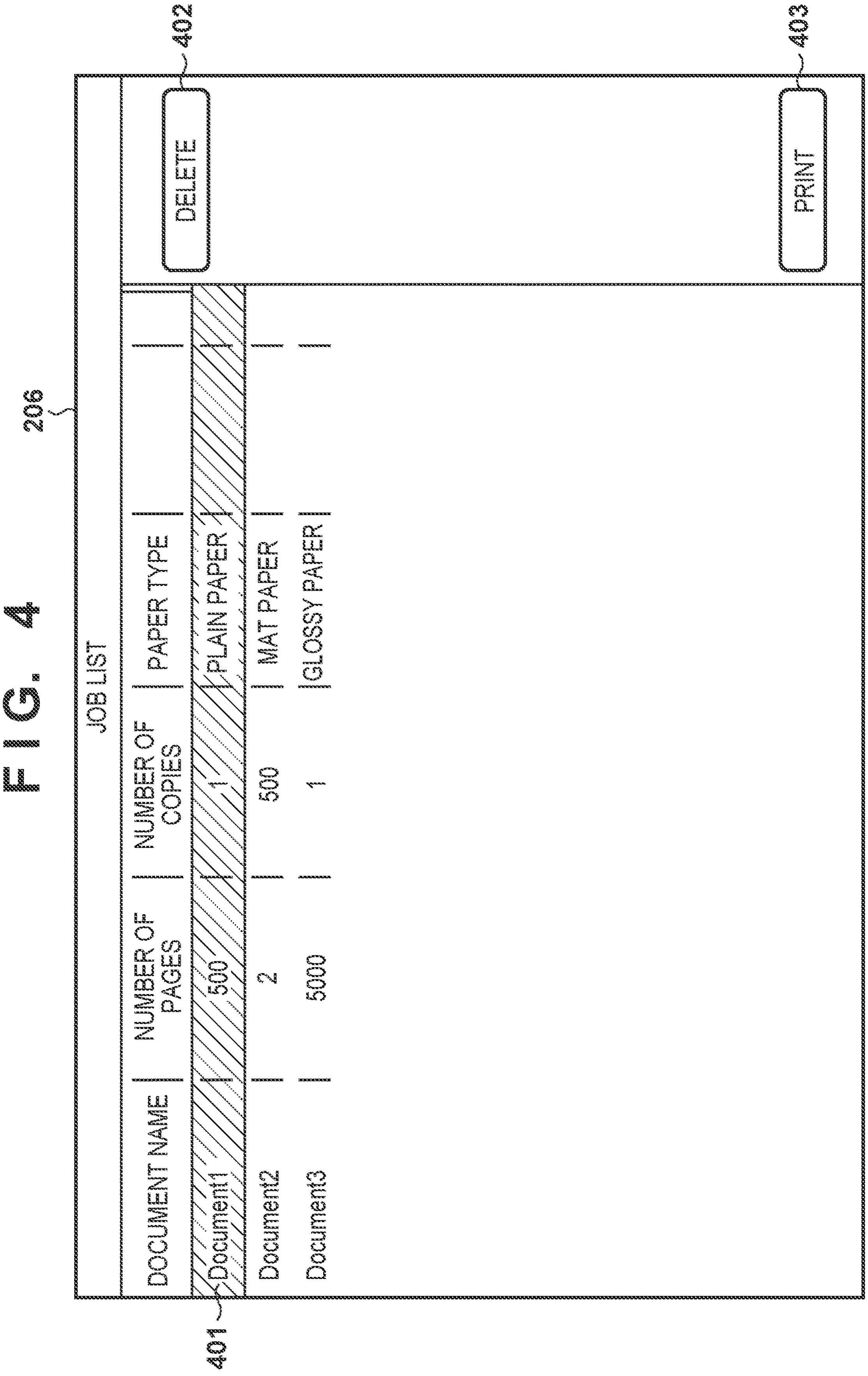
FIG. 4 is a diagram illustrating an example of a screen display of print jobs.

FIG. 4 is a diagram illustrating an example of a print job print setting screen provided by the control unit 201 and the display unit 206.

As illustrated in FIG. 4, a display item 401 indicates one of the print jobs transmitted to the image forming apparatus 100. The display unit 206 displays, in a list, information on print jobs in the order in which they were transmitted. The print job information includes information such as a document name, the number of pages, the number of copies, and a paper type. When the user operates the operation keys of the operation unit 207, print jobs displayed in a list become selectable. A display item 402 is a button for deleting information on a selected print job from the storage unit 208. A display item 403 is a button for starting printing of the selected print job.

When executing a plurality of print jobs in a roll-to-roll image forming apparatus in which the print substrate 110 is pulled out from the roll 106 into which the unprinted print substrate 110 has been wound and the printed matter 111 is wound into a rolled shape after printing and drying, it is desirable that generation and printing of all the print jobs are executed continuously without delay. If generation of a print job is delayed, there is no data to be printed and printing cannot be performed, and so either of the following two situations will occur. One is a situation in which the conveyance of a print substrate is continued while leaving it blank and printing is resumed when print job generation is completed, and the other is a situation in which the conveyance of a print substrate is temporarily stopped and the completion of print job generation is awaited.

Figure 5:
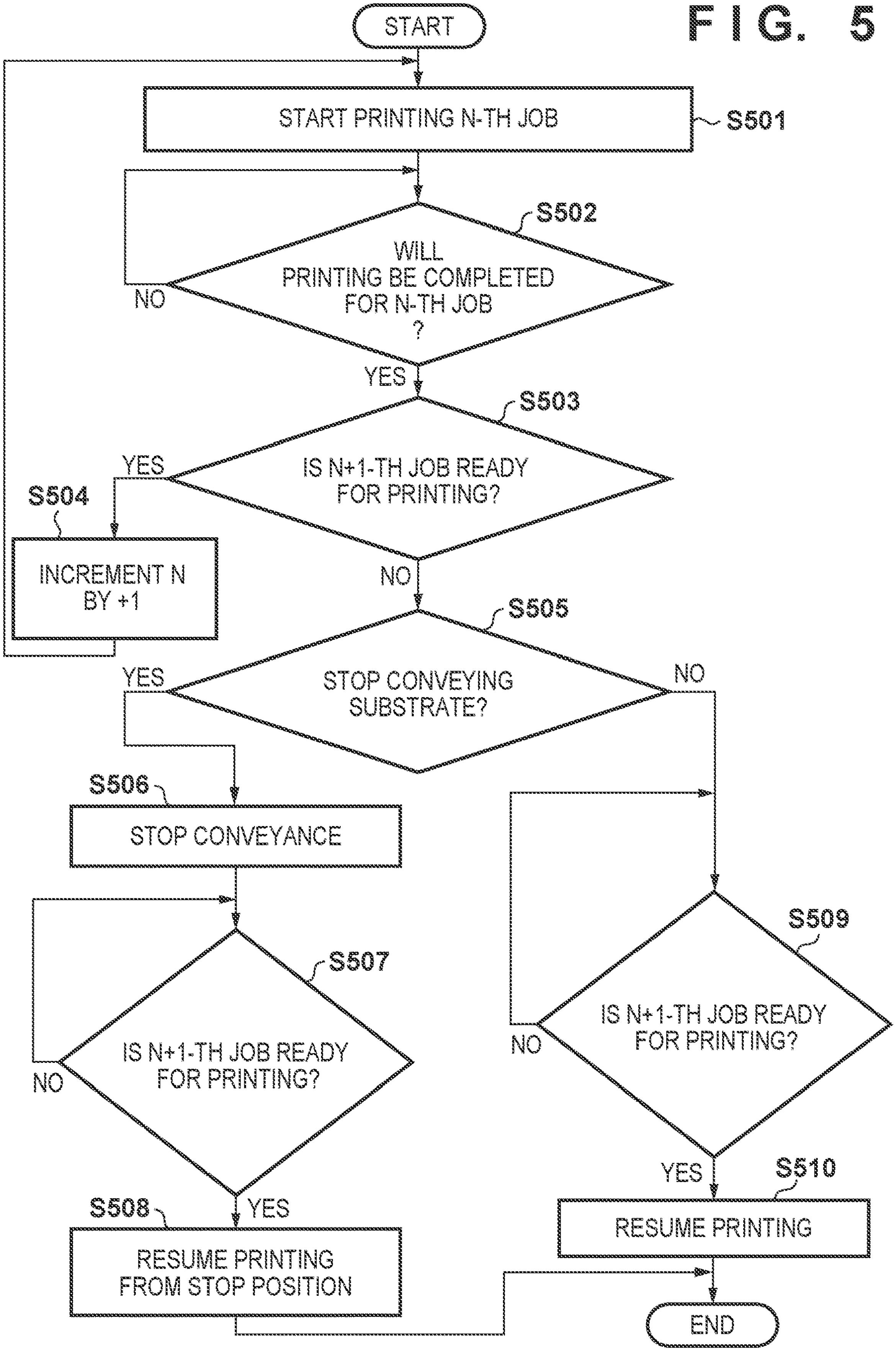
FIG. 5 is a flowchart for explaining the operation of determining the continuation of printing and conveyance processing.

FIG. 5 is a flowchart for explaining the operation of determining the continuation of printing and conveyance processing.

First, in step S501, the control unit 201 starts printing an N-th print job. Here, N is an integer.

In step S502, the control unit 201 determines whether or not printing of the N-th print job (a print job for which image formation is currently being performed) will be completed. If the printing of the N-th print job will be completed, the processing proceeds to step S503, and if the printing will not be completed, the printing is continued.

In step S503, the control unit 201 determines whether or not an N+1-th print job is ready. If the print job is ready, the processing proceeds to step S504, and if it is not ready, the processing proceeds to step S505.

In step S504, 1 is added to N, and printing is continued.

Meanwhile, if the print job is not ready in step S503, the next printing cannot be performed until the print job is ready. The following reasons are conceivable as causes of the N+1-th print job not being ready during printing of the N-th print job: the input timing of the N+1-th print job is late, the processing time of the N+1-th print job by a RIP is longer than the printing time of the N-th print job, and the like. However, in the present embodiment, causes thereof are irrelevant.

In step S505, the control unit 201 determines whether or not to stop the conveyance of the print substrate 110 in a state in which printing cannot be performed. When stopping, the processing proceeds to step S506, and when not stopping, the processing proceeds to step S509.

In step S506, the control unit 201 stops the conveyance of the print substrate 110. In step S507, the control unit 201 determines whether or not the N+1-th print job, that is, the next print job, is ready. If the print job is ready, the processing proceeds to step S508; otherwise, it is waited until it is ready.

In step S508, the control unit 201 resumes printing from a position at which the print substrate 110 has been stopped.

If the conveyance of the print substrate 110 is not stopped in step S505, in step S509, the control unit 201 does not perform printing and only conveys the print substrate 110. Printing is made to wait until the N+1-th print job, that is, the next print job, is ready, and only the conveyance of the print substrate 110 is performed.

When the next print job is ready in step S509, in step S510, the control unit 201 resumes printing. Such a method of stopping only printing and continuing the conveyance of the print substrate 110 is effective when it is expected that the printing speed will be slow and the next print job will be immediately ready.

If the conveyance of the substrate 110 is stopped when printing cannot be continued and it is waited until the next print job is ready as in steps S506 to S508, a printed portion of the N-th print job is being dried in the drying apparatus 104. When the conveyance of the print substrate 110 is stopped in this state, since the printed portion is exposed to excessively high temperature, unevenness and change or deformation of the print substrate may occur due to excessive drying. In order to prevent this, as will be described below, the conveyance operation is performed without stopping until a printed portion (a portion on which an image has been formed) of the N-th print job passes through and exits outside the drying apparatus 104 and the conveyance operation is stopped when the printed portion exits outside in the present embodiment.

Figure 6:
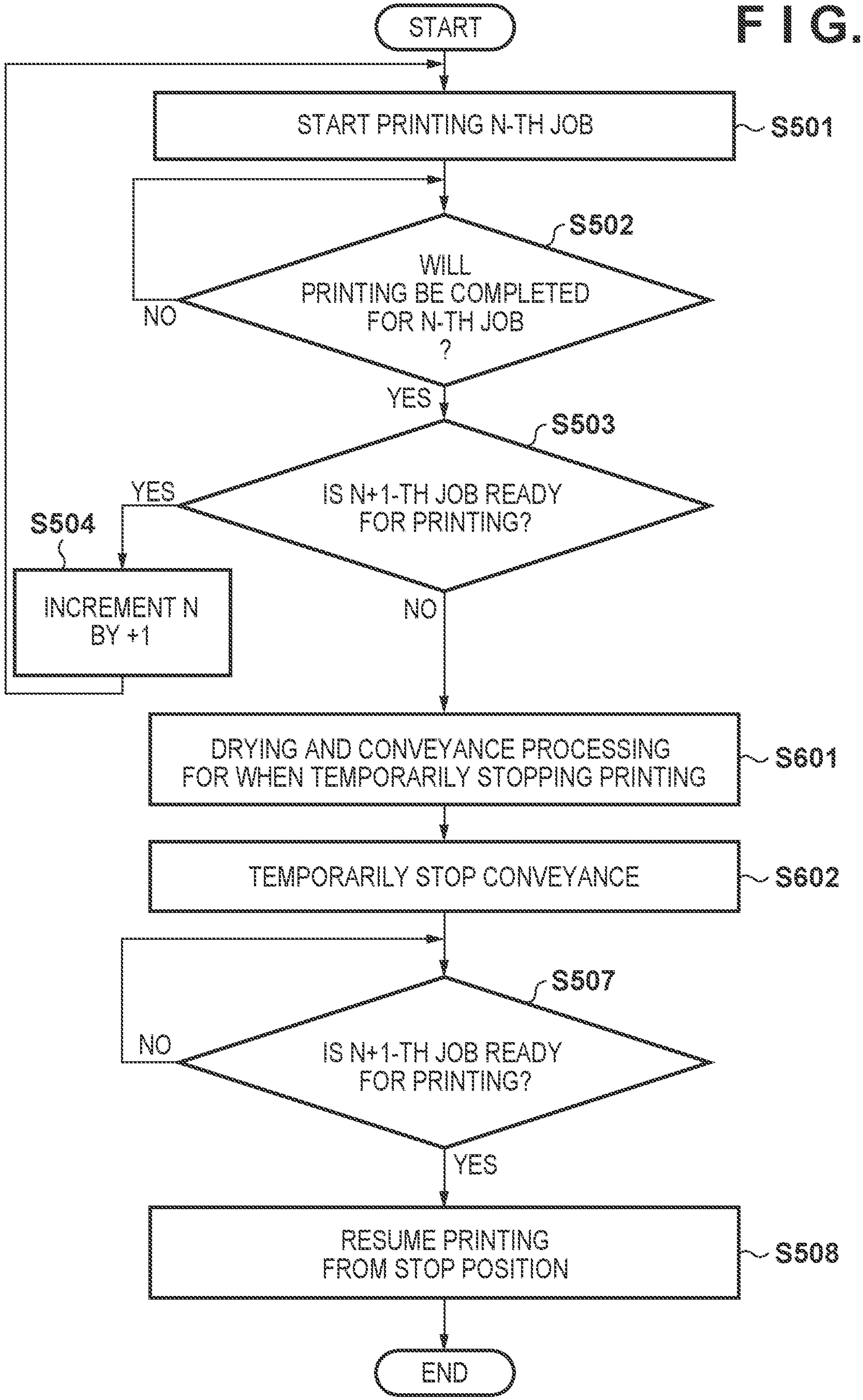
FIG. 6 is a flowchart for explaining the operation of temporarily stopping printing and conveyance.

FIG. 6 is a flowchart for explaining the operation of temporarily stopping printing and conveyance. In FIG. 6, the processing that is the same as FIG. 5 will be assigned the same step number and its description will be omitted.

In step S503, if the N+1-th print job is not ready, the next print cannot be performed until the print job is ready, but the N-th print job is in a drying process in the drying apparatus 104. When printing of the N-th print job is completed, if the conveyance processing is stopped in order to wait for the N+1-th print job to be ready, an N-th print result stops inside the drying apparatus 104 and may be dried more than necessary, thereby becoming overdried. Therefore, in step S601, after a normal drying process of a printed portion has been completed, the control unit 201 calculates the conveyance amount necessary for stopping the printed portion outside the drying apparatus 104 (an ejection position) and conveys the printed matter 111 by the calculated conveyance amount after the printing has been stopped.

In step S602, the control unit 201 stops the conveyance of the printed matter 111 when the print region exits outside the drying apparatus.

In step S507, the control unit 201 determines whether or not the N+1-th print job, that is, the next print job, is ready. If the print job is ready, the processing proceeds to step S508; otherwise, it is waited until it is ready.

In step S508, the control unit 201 resumes printing from a position at which the print substrate 110 has been stopped.

FIGS. 7A to 7D are diagrams illustrating in detail states of printing and conveyance for when temporarily stopping the conveyance of the print substrate 110.

Figures 7A, 7B, 7C, 7D:
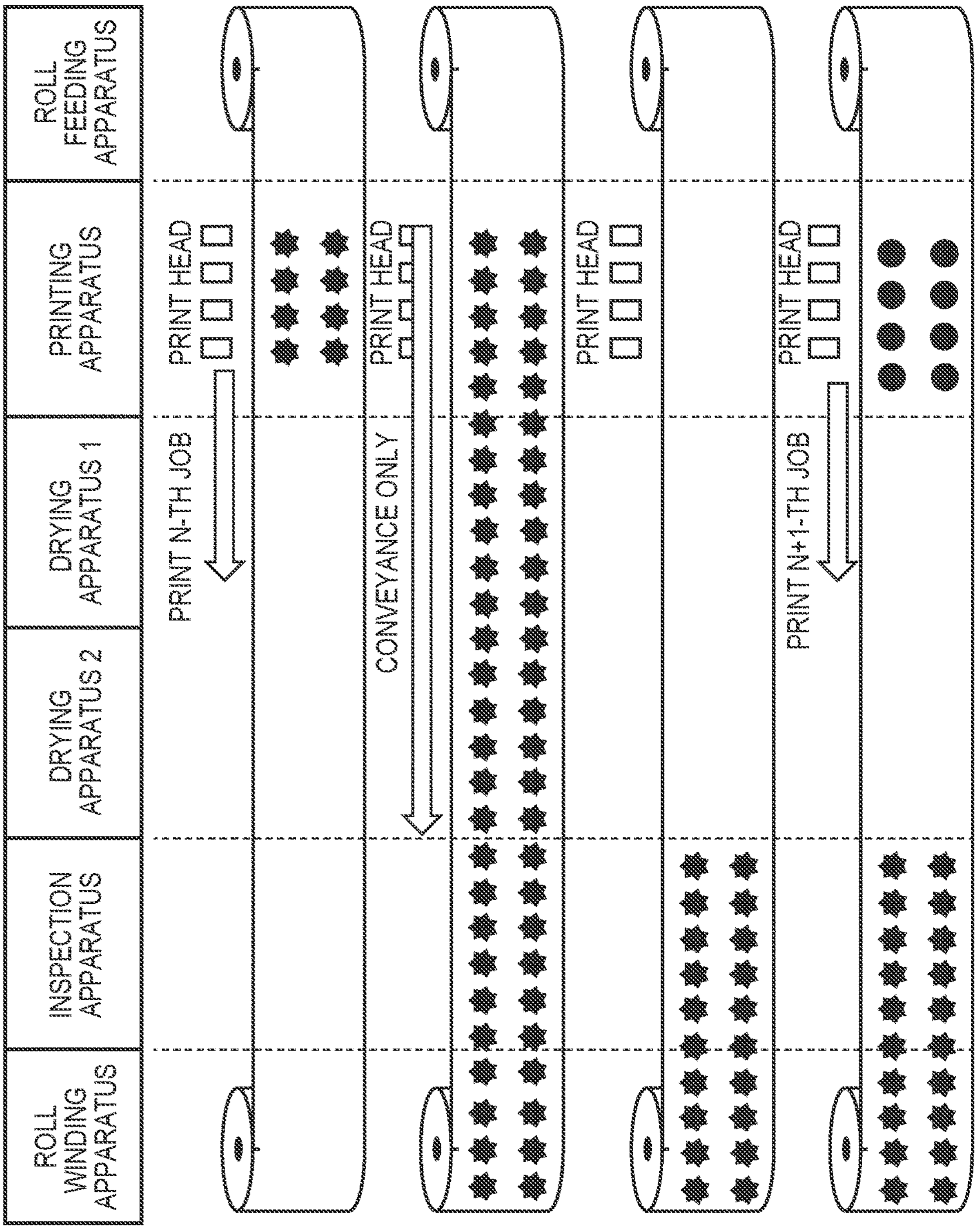
FIGS. 7A to 7D are diagrams illustrating in detail states of printing and conveyance for when temporarily stopping the conveyance of a print substrate.

FIGS. 7A to 7D illustrate an example in which a drying apparatus 1 and a drying apparatus 2 are used in tandem so as to dry the printed matter 111 at a higher speed. Furthermore, after the drying apparatus 2, an inspection apparatus for inspecting whether there is a mistake in the printed matter is provided. FIG. 7A illustrates a state in which the N-th print job is being printed. FIG. 7B illustrates a state in which since the N+1-th print job is not ready, when the printing of the N-th print job is completed, drying processing is being performed while the N-th print job is passing through the drying apparatus 1 and the drying apparatus 2. FIG. 7C illustrates a state in which a printed portion has reached outside the drying apparatus 2 and is stopped there, and the completion of the preparation processing of the N+1-th print job is awaited. FIG. 7D illustrates a state in which the preparation processing of the N+1-th print job has been completed and printing has been resumed. In the present embodiment, the print data of the N-th print job and the print data of the N+1-th print job are illustrated to be different, but they may be the same.

As described above, in the above-described first embodiment, when the next print job is not ready after printing has been completed, after the normal drying of the printed portion has been performed, conveyance is continuously performed until the portion exits the drying apparatus and is stopped. In that state, the next print job becoming ready is awaited. This makes it possible to prevent overdrying of the printed portion.

Second Embodiment

Hereinafter, a second embodiment of the present invention will be described. In the second embodiment, a mark is printed at an interruption start position and an interruption end position at the time of print interruption. By printing marks that indicate the interruption positions, it is possible to clearly distinguish the portion in which print interruption has been performed in the processing performed after printing.

Figure 8:
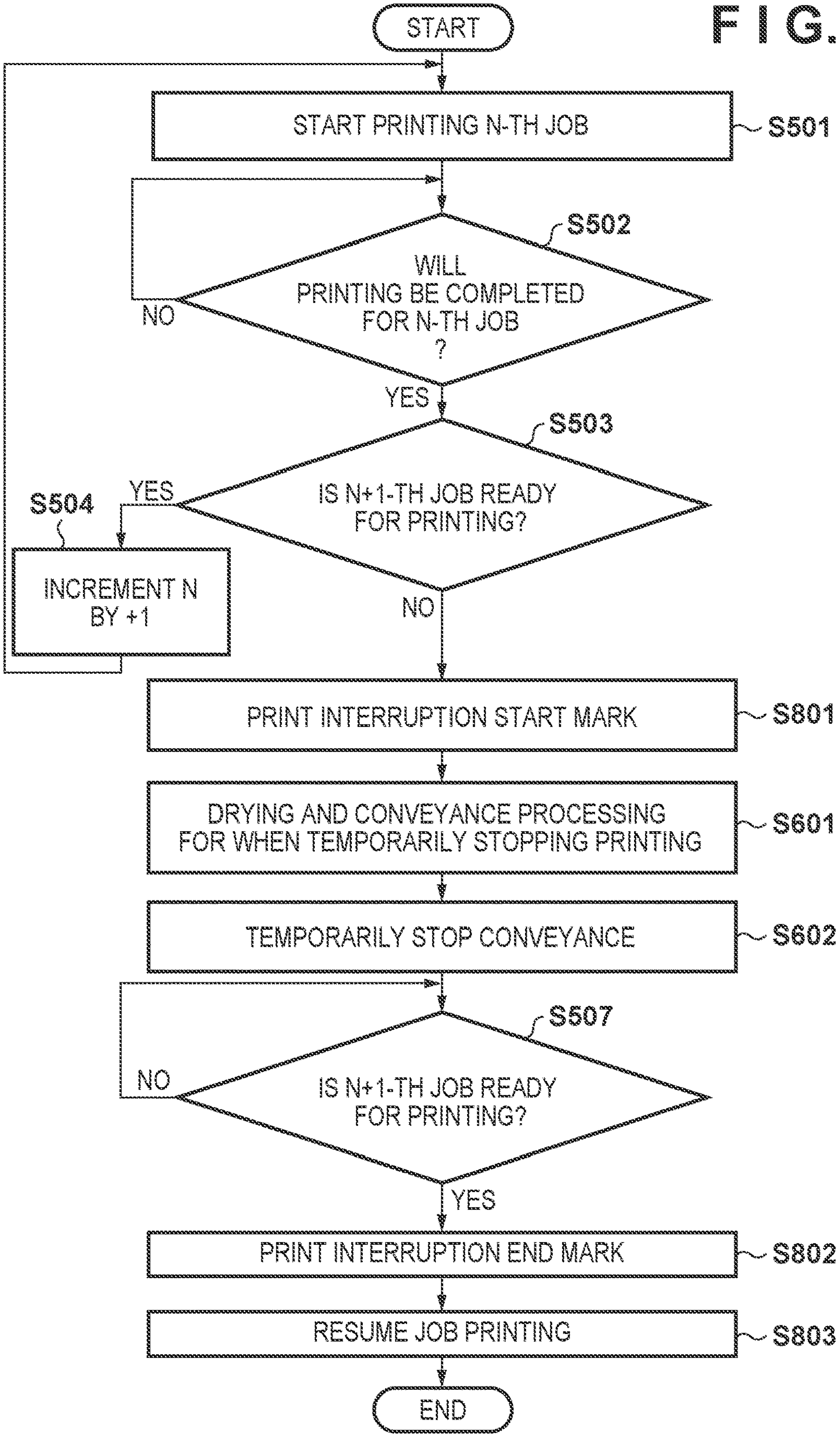
FIG. 8 is a flowchart for explaining the operation of processing for temporarily stopping print substrate conveyance with interruption mark printing.

FIG. 8 is a flowchart for explaining the operation of processing for temporarily stopping print substrate conveyance with interruption mark printing. In FIG. 8, the processing that is the same as FIGS. 5 and 6 will be assigned the same step number and its description will be omitted.

In step S503, if the N+1-th print job is not ready, the next print cannot be performed until the print job is ready, but the N-th print job is in a drying process in the drying apparatus 104. When printing of the N-th print job is completed, if the conveyance processing is stopped in order to wait for the N+1-th print job to be ready, an N-th print result stops inside the drying apparatus 104 and may be dried more than necessary, thereby becoming overdried. In order to prevent overdrying, processing is performed in which a printed portion is stopped outside the drying apparatus 104 after completion of a normal drying process. In such a case, since the N+1-th print job is not printed and only the conveyance processing is performed, a blank region in which nothing is printed is created. The blank region is originally a position where the N+1-th print job is to be printed, and depending on later processing, it is necessary to indicate that it is a blank region or make the print regions continuous by connecting them after cutting out the blank region. Therefore, in step S801, the control unit 201 prints a print interruption start mark after printing the N-th print job.

In step S601, after the normal drying process of a printed portion has been completed, the control unit 201 calculates the conveyance amount necessary for stopping outside the drying apparatus 104 and conveys the printed matter 111 by the calculated conveyance amount after printing is stopped.

In step S602, the control unit 201 stops the conveyance of the printed matter 111 when the print region exits outside the drying apparatus.

In step S507, the control unit 201 determines whether or not the N+1-th print job, that is, the next print job, is ready. If the next print job is ready, the processing proceeds to step S508; otherwise, it is waited until it is ready.

In step S802, the control unit 201 prints an interruption end mark.

In step S803, the control unit 201 resumes printing of the N+1-th print job after printing the interruption mark.

FIGS. 9A to 9D are diagrams illustrating in detail states of printing and conveyance for when temporarily stopping printing and conveyance with printing of interruption marks. FIGS. 9A to 9D illustrate an example in which the drying apparatus 1 and the drying apparatus 2 are used in tandem so as to dry at a higher speed. Furthermore, after the drying apparatus 2, an inspection apparatus for inspecting whether there is a mistake in the printed matter is provided.

Figures 9A, 9B, 9C, 9D:
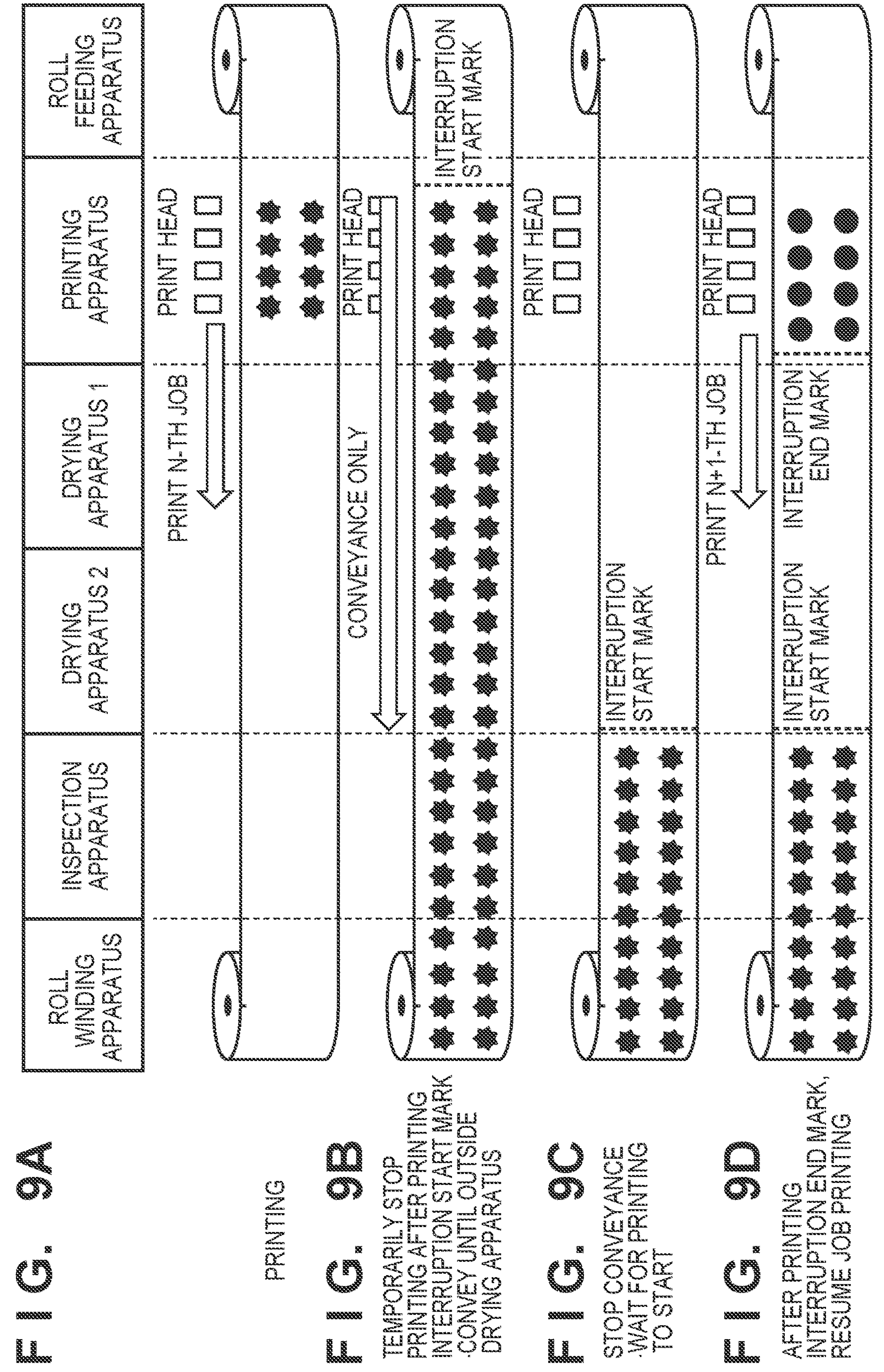
FIGS. 9A to 9D are diagrams illustrating in detail states of printing and conveyance for when temporarily stopping printing and conveyance with printing of interruption marks.

FIG. 9A illustrates a state in which the N-th print job is being printed. FIG. 9B illustrates a state in which since the N+1-th print job is not ready, an interruption start mark is printed after the printing of the N-th print job has been completed and drying processing is being performed while the N-th print job is passing through the drying apparatus 1 and the drying apparatus 2. FIG. 9C illustrates a state in which a printed portion has reached outside the drying apparatus 2 and is stopped there, and the N+1-th print job becoming ready is awaited. FIG. 9D illustrates a state in which the N+1-th print job has become ready and printing has been resumed. An interruption end mark is printed before printing is resumed.

In the second embodiment, the print data of the N-th print job and the print data of the N+1-th print job are illustrated to be different, but they may be the same. Although the interruption start mark and the interruption end mark have been represented by dotted lines, they are not limited to these and may be of other forms. For example, they may be symbols such as circles, triangles, and squares as long as their position can be identified. Furthermore, the interruption start mark and the interruption end mark may be of other shapes. It is also possible to give meaning by the colors of the marks or print with special ink so that it is invisible to the human eye but can be sensed by sensors.

Figure 10A:
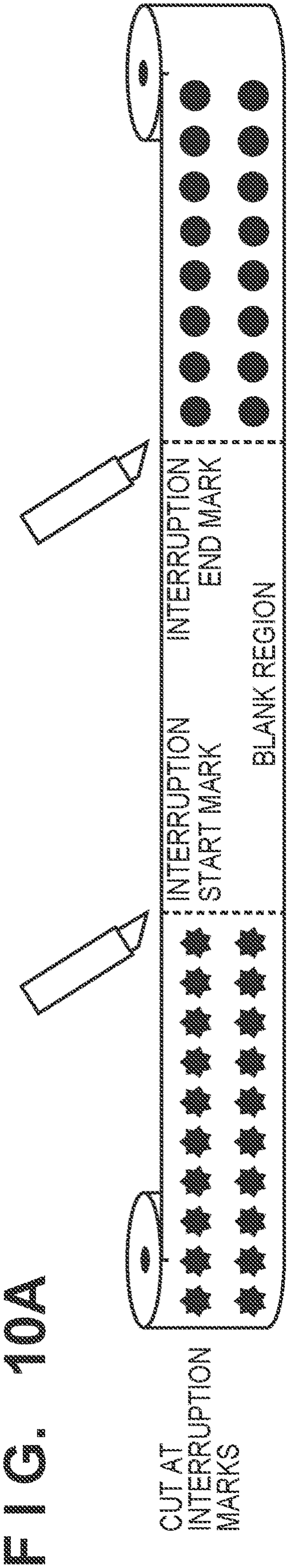
FIGS. 10A and 10B are explanatory diagrams of an example of application of interruption marks.
Figure 10B:
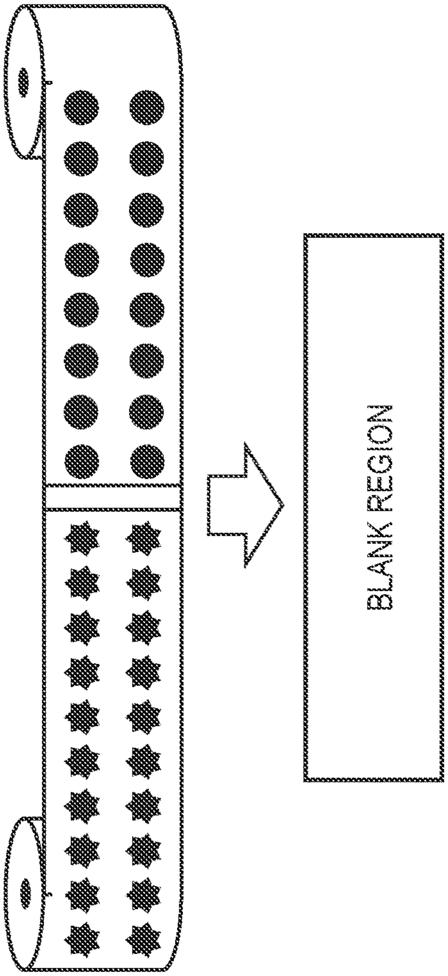

FIGS. 10A and 10B are explanatory diagrams of an example of application of interruption marks. The portion in which printing has been interrupted is a blank region. In some cases, this blank portion may be an obstruction to the subsequent processes, and in such cases, it needs to be cut out. In FIG. 10A, cutting is performed at the positions of an interruption start mark and an interruption end mark. In FIG. 10B, the cut blank region is removed to join the cut printed matter. As a result, it becomes possible to create printed matter in which there is no blank region where printing has been interrupted.

As described above, according to the second embodiment, it is possible to prevent overdrying of the printed portion as in the first embodiment as well as clearly distinguish the portion where print interruption has been performed in processing performed after printing.

Third Embodiment

Hereinafter, a third embodiment of the present invention will be described. In the third embodiment, a case where a plurality of drying apparatuses 104 of FIG. 1 have been connected will be described.

When printed matter is wound into a rolled shape in a state in which the ink at a printed portion is not sufficiently dry, the undried ink is retransferred to the print substrate 110, and so it is necessary to sufficiently dry the ink. The drying apparatus 104 performs control of the temperature and an air volume applied to printed matter in accordance with the characteristics of the print substrate. In such cases, there may be cases where the drying temperature cannot be increased due to the characteristics of the print substrate 110 or cases where the material of the print substrate 110 is a material that is difficult to dry. For such cases, a method in which a plurality of drying apparatuses are connected to improve drying ability is known. Since the amount of heat and time necessary for drying vary depending on the substrate to be printed, it is not necessary to always use a plurality of drying apparatuses for all the print substrates even if an image forming apparatus is that in which a plurality of drying apparatuses are connected. It need only be that a drying apparatus to be used is selected in accordance with the characteristics of the print substrate.

Furthermore, since it is cumbersome to attach or remove the drying apparatuses, it is sufficient not to perform the drying operation in some drying apparatuses while the plurality of drying apparatuses remain connected. Therefore, even when interrupting printing and making it so that a printed portion does not stop in a drying apparatus, it is not necessary to convey the printed portion outside all the drying apparatuses, and it is sufficient that the printed portion is conveyed outside the drying apparatuses being used.

Figure 11:
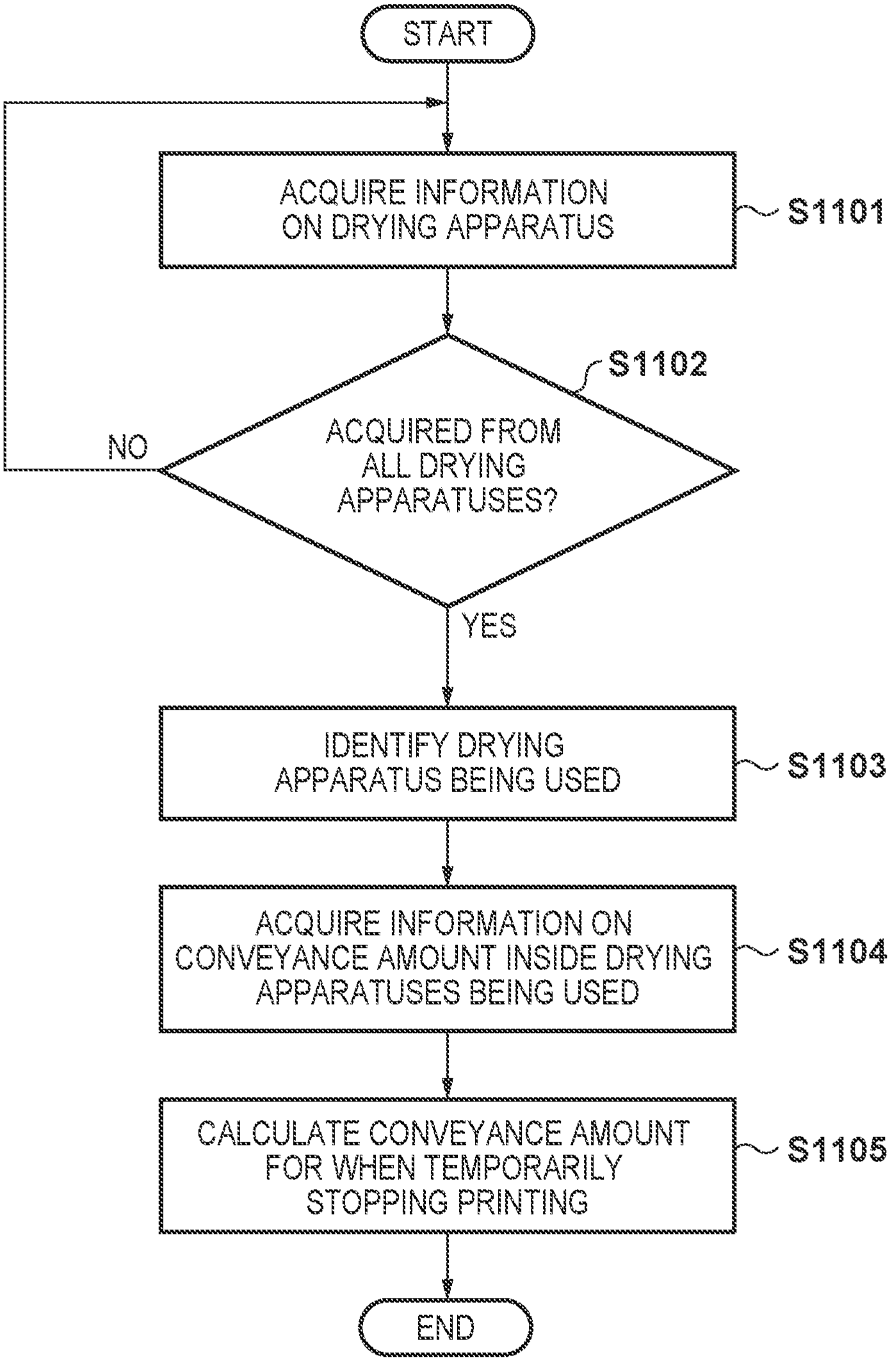
FIG. 11 is a flowchart for explaining the operation of calculating a conveyance amount for when using some of a plurality of drying apparatuses.

FIG. 11 is a flowchart for explaining the operation of calculating a conveyance amount for when using some of a plurality of drying apparatuses.

In step S1101, the control unit 201 acquires information for determining whether or not the respective drying apparatuses are being used.

In step S1102, the control unit 201 determines whether or not usage information has been acquired from all the drying apparatuses that are connected and repeats step S1101 until acquisition is made from all the drying apparatuses.

In step S1103, the control unit 201 identifies the drying apparatuses being used among all the drying apparatuses.

In step S1104, the control unit 201 acquires information on an inner conveyance length of the drying apparatuses being used.

In step S1105, the control unit 201 calculates a conveyance amount by which a print substrate is to be conveyed at the time of a temporary stop based on the sum of the length of conveyance inside all the drying apparatuses being used.

FIGS. 12A to 12D are explanatory diagrams of processing for temporarily stopping a print substrate for when using some of the plurality of drying apparatuses. In FIGS. 12A to 12D, a configuration is that in which the drying apparatus 1 and the drying apparatus 2 are connected, but in this embodiment, it is assumed that the drying apparatus 2 is not used. Furthermore, after the drying apparatus 2, an inspection apparatus for inspecting whether there is a mistake in the printed matter is provided.

Figures 12A, 12B, 12C, 12D:
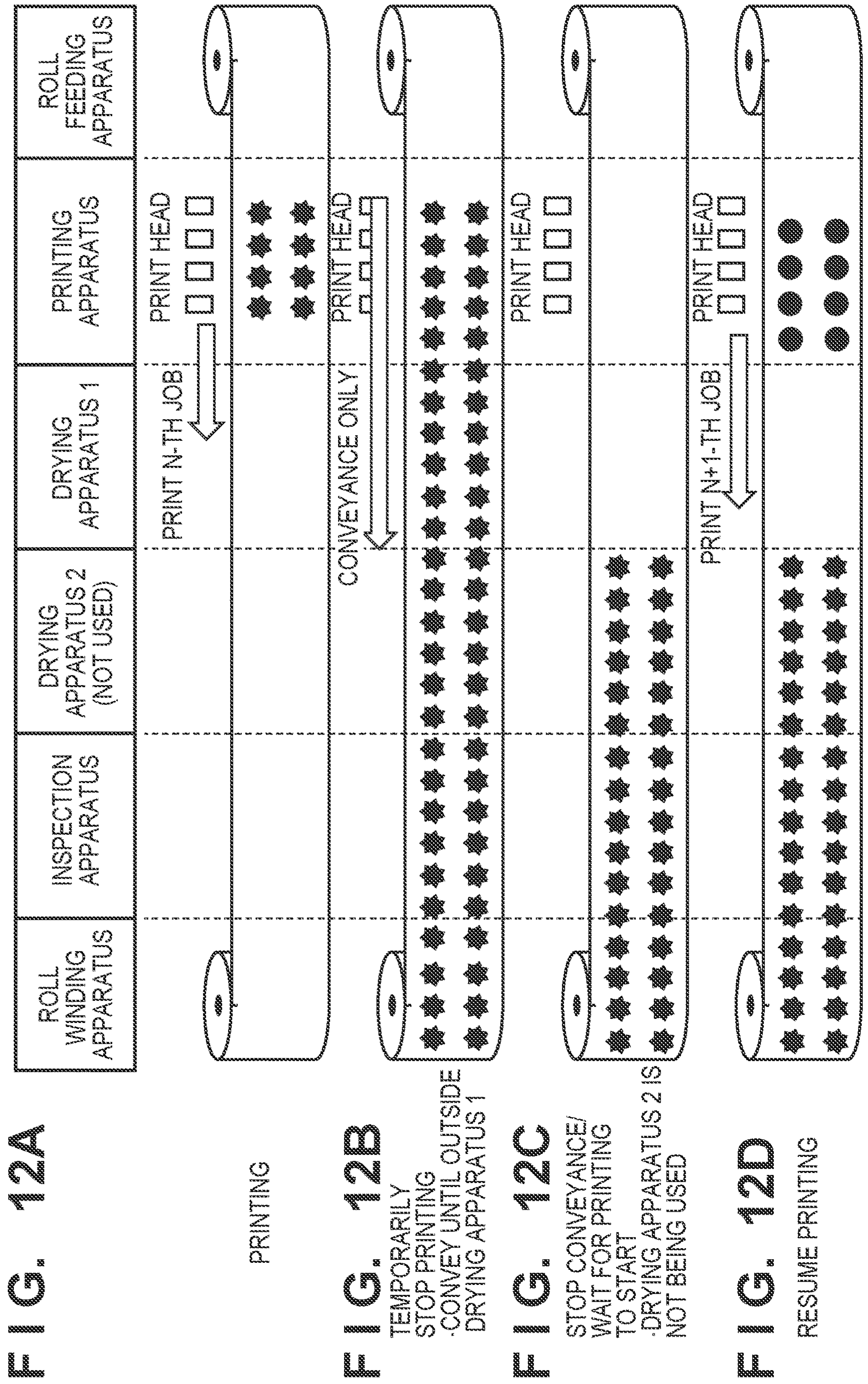
FIGS. 12A to 12D are explanatory diagrams of processing for temporarily stopping a print substrate for when using some of the plurality of drying apparatuses.

FIG. 12A illustrates a state in which the N-th print job is being printed. FIG. 12B illustrates a state in which since the N+1-th print job is not ready, when the printing of the N-th print job is completed, drying processing is being performed while the N-th print job is passing through only the drying apparatus 1. FIG. 12C illustrates a state in which a printed portion has reached outside the drying apparatus 1 and is stopped there, and the N+1-th print job becoming ready is awaited. Although the drying apparatus 2 is connected, since it is a drying apparatus that is not being used, it does not matter even if a print portion stops inside the drying apparatus 2. FIG. 12D illustrates a state in which the N+1-th print job has become ready and printing has been resumed. In the present embodiment, the print data of the N-th print job and the print data of the N+1-th print job are illustrated to be different, but they may be the same.

As described above, according to the present embodiment, performing the conveyance operation by only a necessary amount at the time of print interruption makes it possible to reduce wasteful print substrate on which printing is not performed.

Other Embodiments

Embodiment(s) of the present invention can also be realized by a computer of a system or apparatus that reads out and executes computer executable instructions (e.g., one or more programs) recorded on a storage medium (which may also be referred to more fully as anon-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-115830, filed Jul. 13, 2021, which is hereby incorporated by reference herein in its entirety.

What is claimed is:

1. An image forming apparatus comprising:

a conveyance unit configured to convey a long-shaped print medium in a longitudinal direction;

an image forming unit configured to form an image on the print medium;

a drying unit configured to dry the print medium on which an image has been formed in the image forming unit; and a control unit configured to, after interrupting image formation on the print medium by the image forming unit, control the image forming unit and the conveyance unit so as to convey a portion of the print medium on which image formation has been performed up to an ejection position at which the portion is ejected from inside of the drying unit and then stop the conveyance, wherein in a state in which preparation of a next image forming job has not finished when image formation according to an image forming job for which an image is being formed finishes, image formation on the print medium by the image forming unit is interrupted.

2. The image forming apparatus according to claim 1, further comprising:

a feeding unit that is disposed upstream of the image forming unit with respect to a conveyance direction of the conveyance unit and is configured to feed the long-shaped print medium from a roll into which the print medium has been wound; and a winding unit that is disposed downstream of the drying unit in the conveyance direction of the conveyance unit and is configured to wind the print medium on which image formation has been performed into a rolled shape.

3. The image forming apparatus according to claim 1, wherein the control unit causes conveyance of the print medium to wait in a state in which the print medium is stopped at the ejection position until the preparation of the next image forming job finishes.

4. The image forming apparatus according to claim 3, wherein the control unit resumes formation of an image by the image forming unit and conveyance of the print medium by the conveyance unit after the preparation of the next image forming job has finished.

5. The image forming apparatus according to claim 1, wherein from interruption of image formation on the print medium by the image forming unit until after the interruption, the control unit conveys the portion of the print medium on which image formation has been performed to the ejection position without stopping conveyance of the print medium.

6. The image forming apparatus according to claim 1, further comprising:

a calculation unit configured to calculate a conveyance amount of the conveyance unit for ejecting from inside the drying unit a portion of the print medium on which image formation has been performed after interruption of image formation on the print medium by the image forming unit.

7. The image forming apparatus according to claim 1, wherein the image forming unit forms on the print medium a start mark that indicates a start of interruption of image formation before interruption of image formation on the print medium by the image forming unit and forms on the print medium an end mark that indicates an end of interruption of image formation before resumption of image formation according to the next image forming job by the image forming unit.

8. The image forming apparatus according to claim 7, wherein modes of the start mark and the end mark are different.

9. The image forming apparatus according to claim 7, wherein shapes of the start mark and the end mark are different.

10. The image forming apparatus according to claim 7, wherein colors of the start mark and the end mark are different.

11. The image forming apparatus according to claim 1, wherein the drying unit includes a plurality of drying apparatuses and the ejection position is a position at which the portion of the print medium on which image formation has been performed is ejected from inside a drying apparatus that is used among the plurality of drying apparatuses.

12. A method of controlling an image forming apparatus having a conveyance unit configured to convey a long-shaped print medium in a longitudinal direction, an image forming unit configured to form an image on the print medium, and a drying unit configured to dry the print medium on which an image has been formed in the image forming unit, the method comprising:

after interruption of image formation on the print medium by the image forming unit, controlling the image forming unit and the conveyance unit so as to convey a portion of the print medium on which image formation has been performed up to an ejection position at which the portion is ejected from inside of the drying unit and then stop the conveyance, wherein in a state in which preparation of a next image forming job has not finished when image formation according to an image forming job for which an image is being formed finishes, image formation on the print medium by the image forming unit is interrupted.

13. A non-transitory computer readable storage medium storing a program for causing a computer to execute a method of controlling an image forming apparatus having a conveyance unit configured to convey a long-shaped print medium in a longitudinal direction, an image forming unit configured to form an image on the print medium, and a drying unit configured to dry the print medium on which an image has been formed in the image forming unit, the method comprising:

after interruption of image formation on the print medium by the image forming unit, controlling the image forming unit and the conveyance unit so as to convey and then stop at an ejection position at which the portion has been ejected from inside of the drying unit a portion of the print medium on which image formation has been performed, wherein in a state in which preparation of a next image forming job has not finished when image formation according to an image forming job for which an image is being formed finishes, image formation on the print medium by the image forming unit is interrupted.

* * * * *